INVENTOR.
Edward Janowski
BY Thomas A. Junker
ATTORNEY

Dec. 9, 1952 — E. JANOWSKI — 2,620,850
APPARATUS FOR THE MANUFACTURE OF VENETIAN BLIND LADDER TAPE
Filed Nov. 2, 1948 — 9 Sheets-Sheet 4
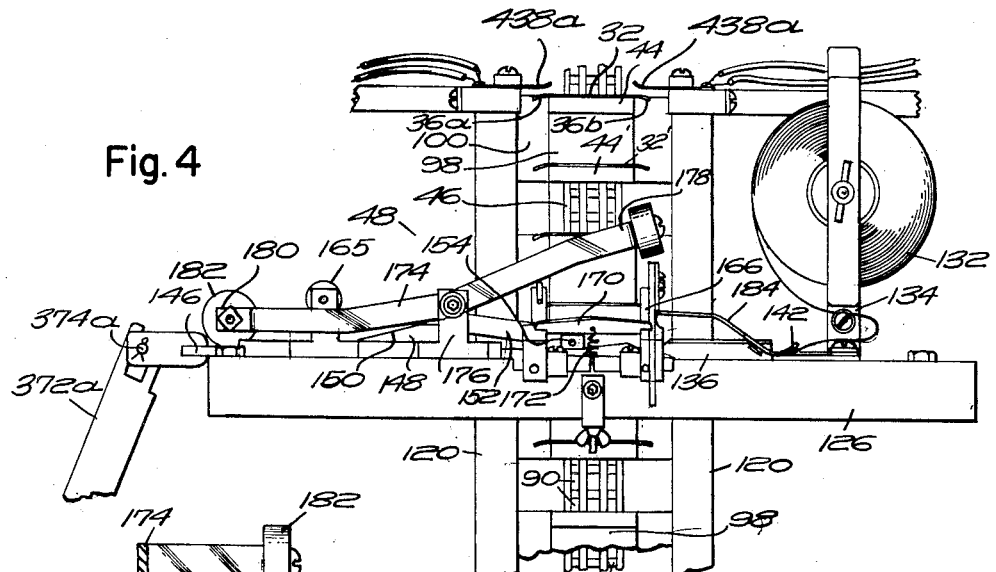
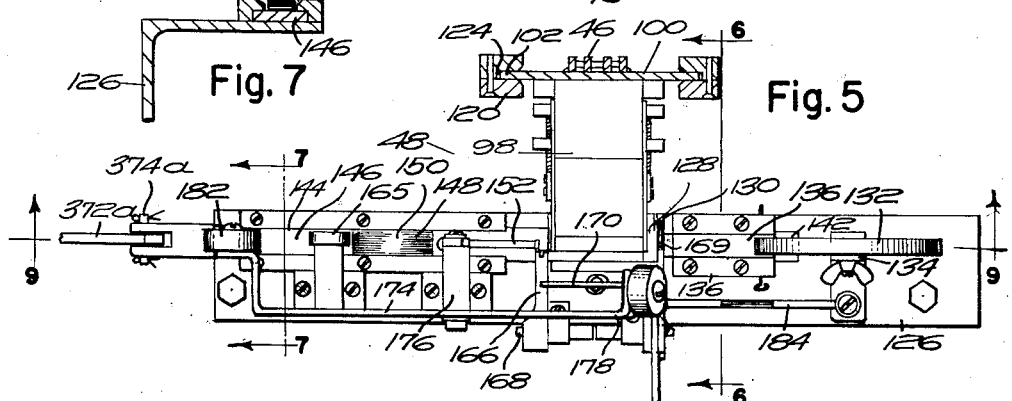
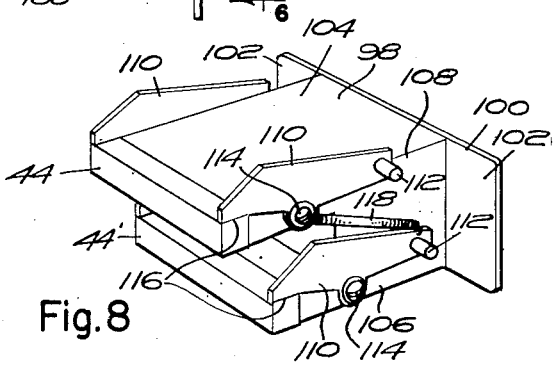
INVENTOR.
Edward Janowski
BY
ATTORNEY Dec. 9, 1952 — E. JANOWSKI — 2,620,850
APPARATUS FOR THE MANUFACTURE OF VENETIAN BLIND LADDER TAPE
Filed Nov. 2, 1948 — 9 Sheets-Sheet 6

INVENTOR.
Edward Janowski
BY Thomas A. Jenches
ATTORNEY

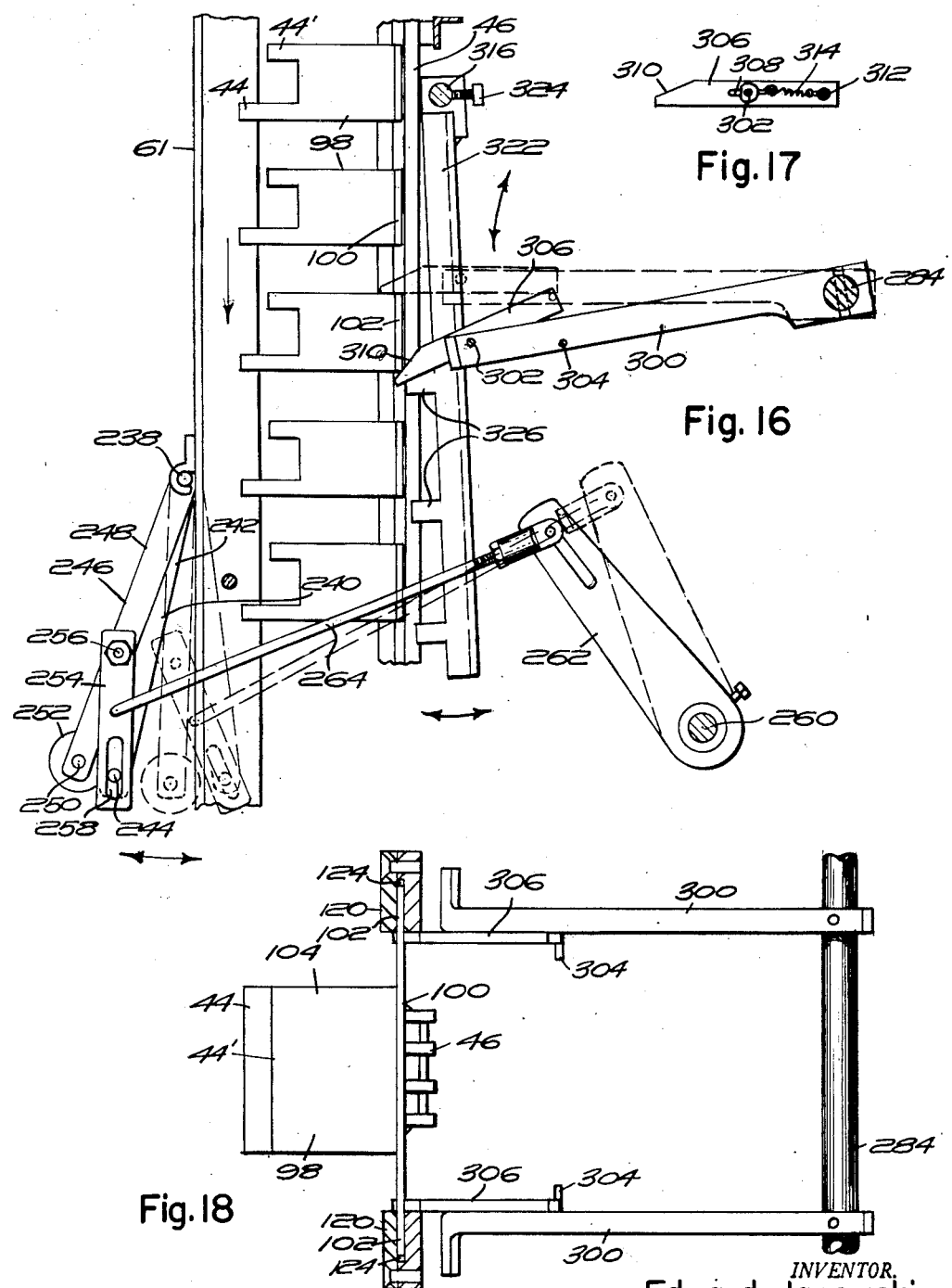

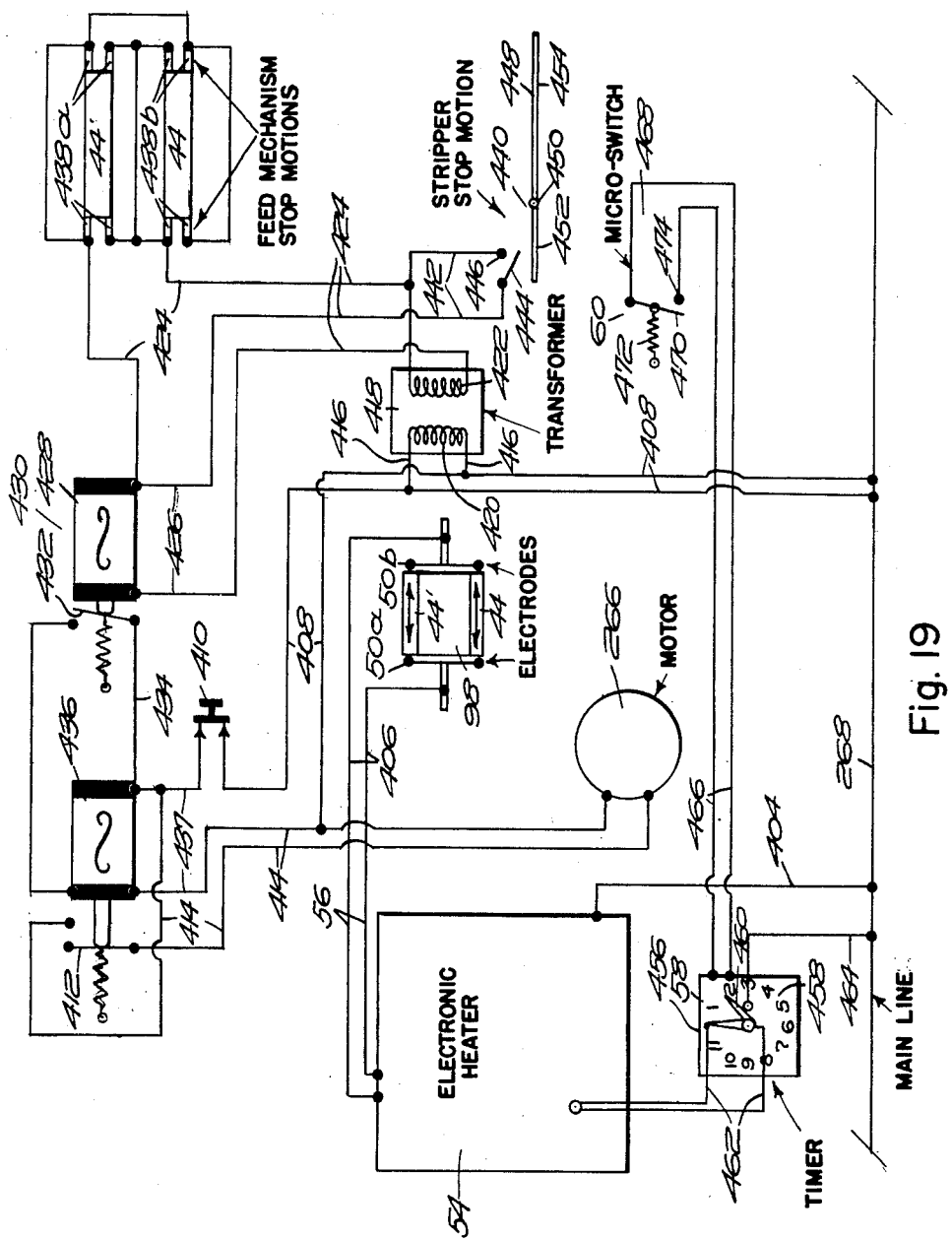

Dec. 9, 1952    E. JANOWSKI    2,620,850
APPARATUS FOR THE MANUFACTURE
OF VENETIAN BLIND LADDER TAPE
Filed Nov. 2, 1948    9 Sheets-Sheet 9

INVENTOR.
Edward Janowski
BY Thomas A. Jenckes
ATTORNEY

Patented Dec. 9, 1952

2,620,850

UNITED STATES PATENT OFFICE 2,620,850

APPARATUS FOR THE MANUFACTURE OF VENETIAN BLIND LADDER TAPE

Edward Janowski, Pawtucket, R. I.

Application November 2, 1948, Serial No. 57,912

8 Claims. (Cl. 154—1.6)

My invention relates to improvements in plastic ladder tape for Venetian blinds and improved methods and apparatus for its manufacture.

An object of my invention is to provide a plastic ladder tape for Venetian blinds constructed entirely or substantially entirely out of plastic.

Objects of my invention, therefore, are to provide a novel type of plastic tape which may be transparent, translucent or opaque, which can be embossed or printed on or can have silver or gold leaf secured thereto, or which can be otherwise dyed or ornamented in novel fashions not possible with the woven tape of the prior art. In addition, such a tape may be dyed a light fast color, faster than possible with woven tapes and may provide in use a glossy sheen, which is a pleasing novelty, particularly if the tape itself is translucent or transparent.

The greatest objection, and one that limits the demand for Venetian blinds is the periodical, necessary changing of ladder tapes, because of color fading and general deterioration. My plastic ladder tape lasts as long as the slats, eliminating this undesirable feature of ladder tape now on the market.

A further object of my invention is to provide a tape which is waterproof, dustproof, mildewproof, resistant to dry rot, has straight non-wavy edges and which is chemical and vapor resistant and which is less inflammable than woven tape.

A further object of my invention is to provide such ladder tape which may be readily cleaned by merely wiping it off with a damp cloth and from which oil stains and grease forming finger marks may be readily removed and also are not readily received thereon.

A further object of my invention is to provide such a ladder tape which is nonstretching in use, either from the inherent structure of the ladder tape or by the use of stretch limiting cords incorporated therein in a hidden manner.

A further object of my invention is to provide a tape in which the ladders are secured to the tape side portions with an extremely tight bond, so tight that the side tapes themselves will tear instead of the bond pulling off, and one in which the spacing of each ladder is absolutely accurate, much more accurate than is possible with woven tapes.

Further objects of my invention relate to my improved method of manufacture of said tape which comprises inserting the plastic rungs between the spaced plastic ladder tapes, with the ends thereof bent against said tapes for a substantial distance and applying welding radio frequency heat through said turned ends and opposite tape portions to weld said ends to said tape portions with the tape itself acting as a dielectric, preferably while additionally conducting said electric current between said aligned ends to obtain a greater heat.

A further feature of my invention relates to the provision of a machine for making my improved type of tape particularly adapted for use in radio frequency dielectric welding, although other types of means may be employed to secure the ends of the ladders to the tape, if desired.

A further object of my invention is to provide a machine for this purpose which is the essence of simplicity merely providing means to insert plastic ladder tapes between continuous runs of moving side tapes, stopping the runs of said side tapes while welding them, and then continuing their forward run involving broadly two main steps, namely, (a) the initial assembly, and (b) the securing.

While in my improved machine, I weld the ends of two staggered rungs to the side ladder strips as usual, it is obvious that my method may be employed for welding one of a large plurality of rung ends to the side tapes if desired in use.

It is obvious that this method has many advantages over weaving the tapes. The cross stitch which has to be cut is eliminated. Many operations in the manufacture of the individual threads are eliminated. The dyeing is also eliminated and the device may produce tape several hundred percent faster than can be done on a loom, welding four ends at the same time, it being obvious that this percentage may be greatly increased in the event that more than four rung ends are welded at the same time.

A further object of my invention is to provide a machine which may, if desired, weld a plurality of rung ends at once.

A further object of my invention is to provide a machine taking up a minimum of floor space per unit.

A further object of my invention is to provide a machine in which it is easy to change over from one color to another.

A further object of my invention is to provide a machine in which the accuracy of spacing is positively identical and automatic and much more accurate than that provided in a loom where it has been found that each loom provides a slightly different spacing.

A further object of my invention is to provide a machine which is fully automatic in its action.

A further object of my invention is to provide a machine particularly adapted for use in radio frequency dielectric welding which will function to give a strong bond with a smaller electronic unit without arcing. Arcing presented one of the greatest problems in the development of the machine and I have found that if the electrodes are universally mounted on the devices employed for reciprocating them into position that the arcing was substantially reduced.

A further object of my invention relates to the provision of a machine including an intermittently movable conveyor on which the ladder rungs are successively mounted and brought into position between the continuous side tapes, so that the ends thereof will bend backwardly in the same direction in a position for welding. All the operations may take place on a single run of the conveyor, but in the embodiment shown I preferably provide a rung loading means on the upward straight rear run of the conveyor and a welding on the downward straight front run of the conveyor.

A further feature of my invention lies in the structure of jigs I employ to insulatedly mount the rung holders on the conveyor, preferably comprising supporting cross conducting rods on which the rungs are mounted to abut the inturned ends of the rungs and adjacent side portions to provide a greater welding heat than if the current were merely grounded on the inside of the side tapes, which jigs are preferably provided with means to hold them in alignment on a straight run and at a spaced distance apart with suitable means for automatically clamping the rungs as they are fed into position thereon.

A further object of my invention relates to the novel type of feeding mechanism I have provided for loading and holding the rungs on each jig arm and preferably also cutting the rungs from a source of supply, so that the ends of each rung will extend laterally equidistantly from their holding means or conducting bars.

A further feature of my invention relates to the improved means I preferably employ for feeding the side tapes evenly into position to have the inturned ends of the rungs welded or otherwise secured thereto, and the means I employ to guide said side tapes into such position.

A further feature of my invention relates to the specific type of mechanism applying high radio frequency heat and welding, including a novel type of electrode for this purpose, and the means of supporting it and its actuating means on the machine.

A further feature of my invention relates to the intermittent feed I preferably provide for the conveyor, preferably in combination with the other mechanism, to actuate all other mechanism during each stop of the conveyor, and also to an overrun stop lock I preferably employ in combination therewith.

Further features of my invention relate to the specific type of means I employ for actuating the various parts of my invention.

A further feature of my invention relates to the improved type of means I employ for stripping the completed tape from the conveyor.

A further feature of my invention relates to the stop motions I preferably employ and the electric circuit for their functioning, which stop motions include a motion to automatically stop the machine in the event a rung is not correctly loaded on the conveyor and a switch to stop the machine in the event the completed tape is not being stripped from the conveyor.

A further feature of my invention relates to the particular type of means I employ to control the welding heat and limit it to the fraction of a cycle that the welding heat is required and then for a settable time.

These and such other objects of my invention as may hereinafter appear will be best understood from a description of the accompanying drawings, which illustrate an embodiment thereof.

In the drawings,

Fig. 4 is a fragmentary rear elevation of the rung feeding mechanism.

Fig. 5 is a plan view of the rung feeding mechanism shown in Fig. 4.

Fig. 6 is a fragmentary side elevation of the conveyor and attached jigs passing by the feeding mechanism showing a portion thereof in section along the line 6—6 of Fig. 5.

Fig. 7 is a transverse sectional view taken along the line 7—7 of Fig. 5.

Fig. 8 is a perspective view of the improved jig I preferably employ.

Figure 1:
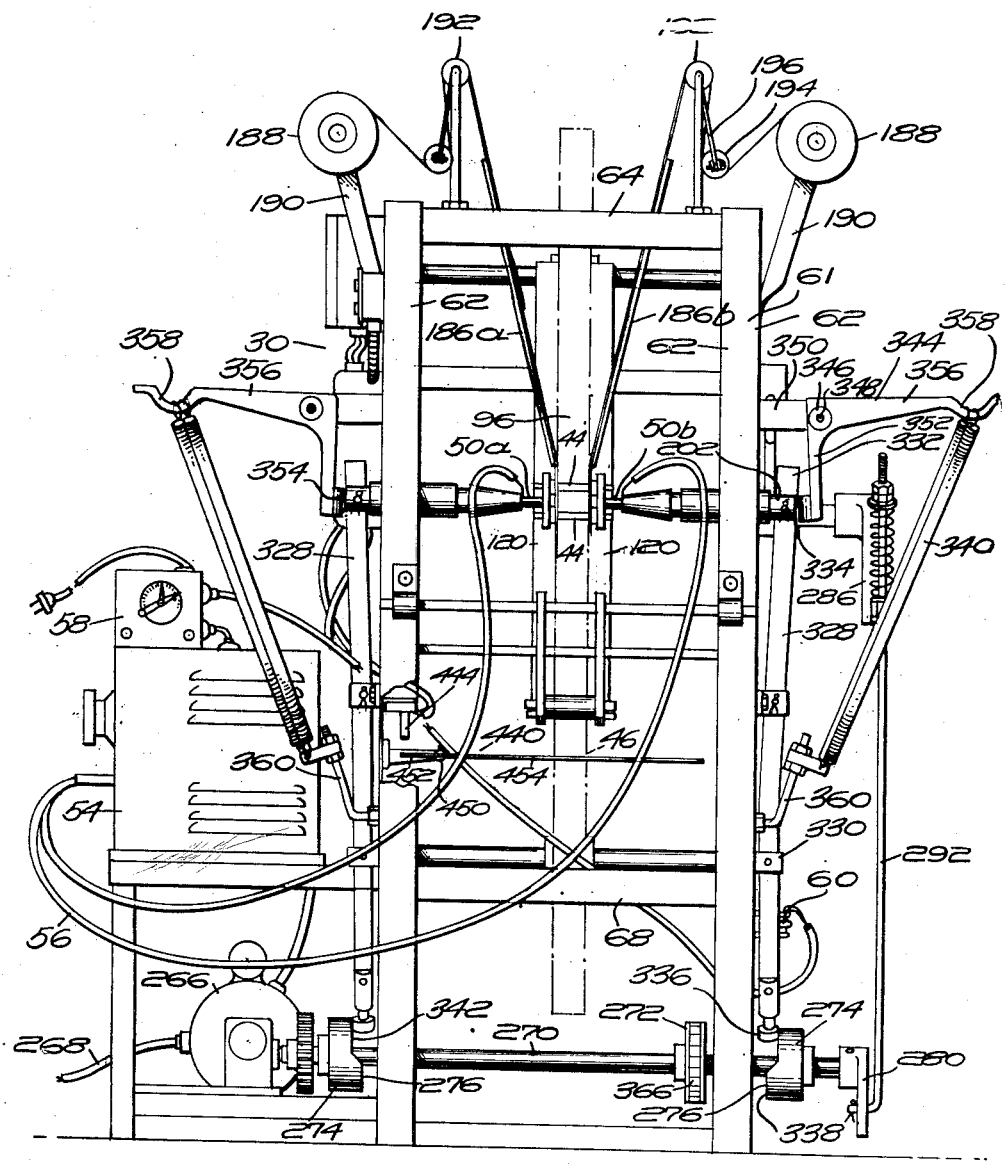
Fig. 1 is a front elevation of an automatic machine for intermittently welding plastic ladder rungs to continuous strips of spaced ladder side tapes constructed in accordance with my invention.
Figure 2:
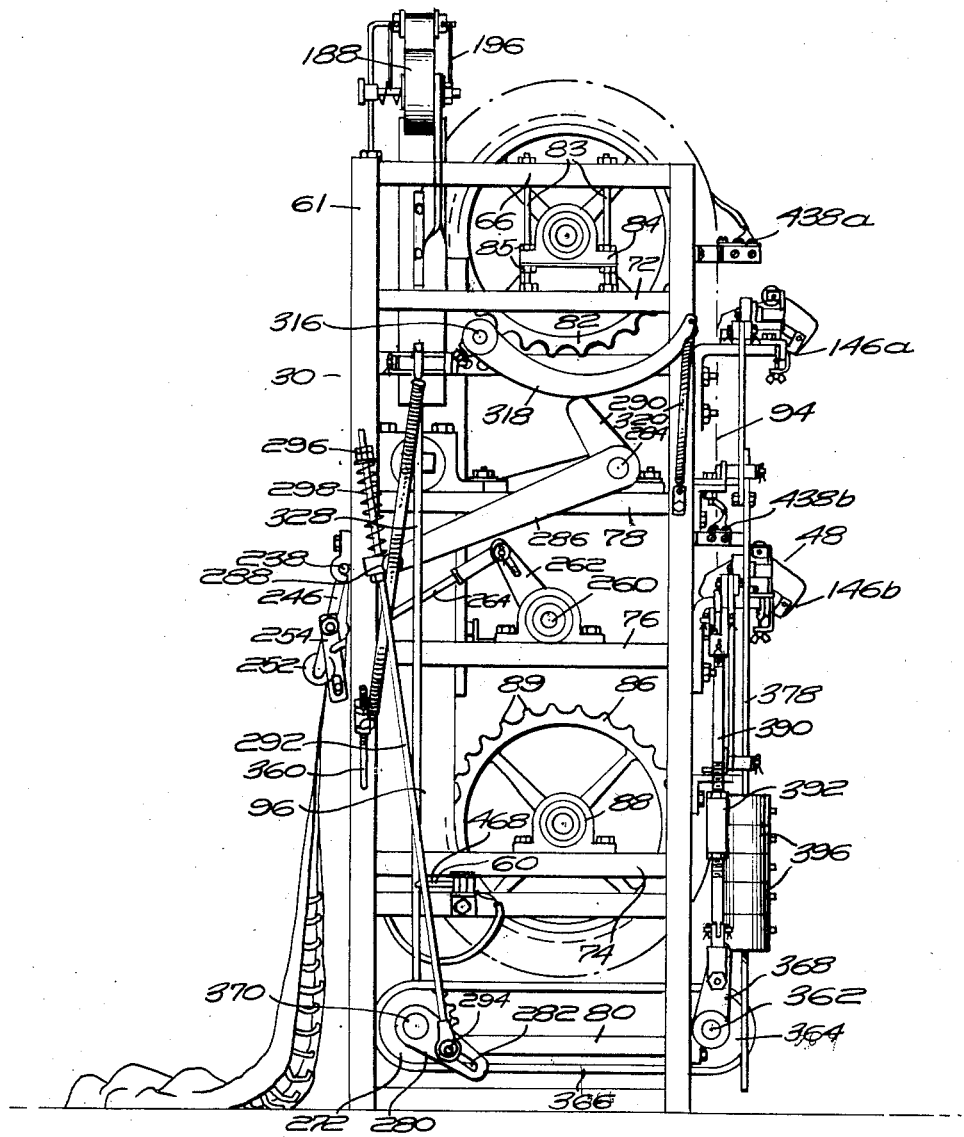
Fig. 2 is a side elevation thereof.
Figure 3:
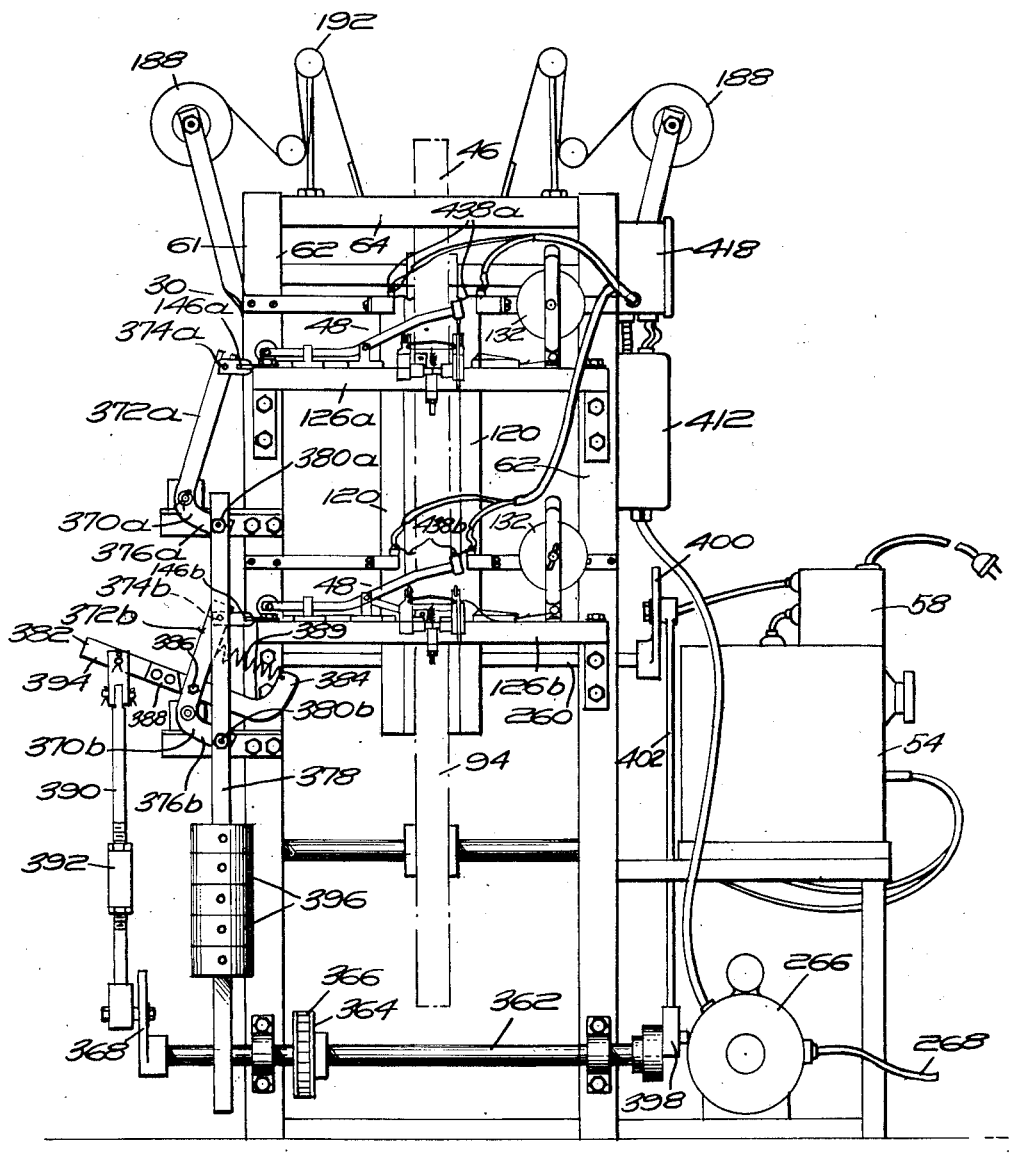
Fig. 3 is a rear elevation thereof.
Figure 9:
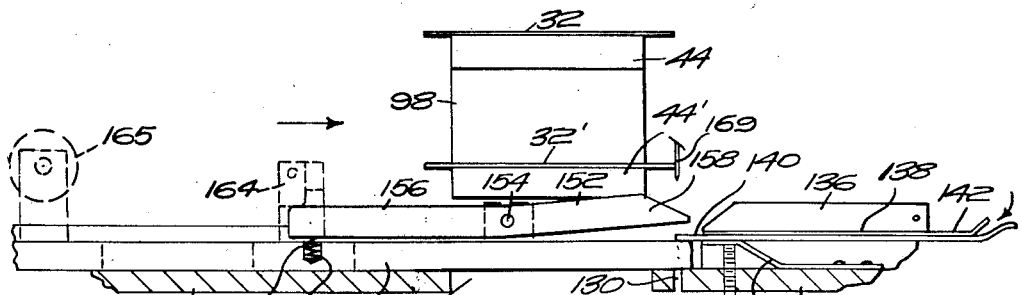
Figure 10:
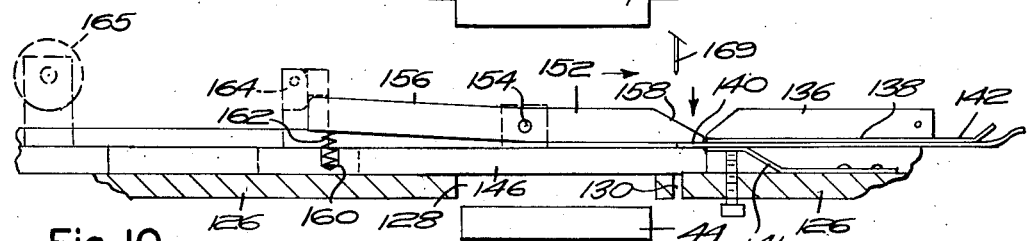
Figure 11:
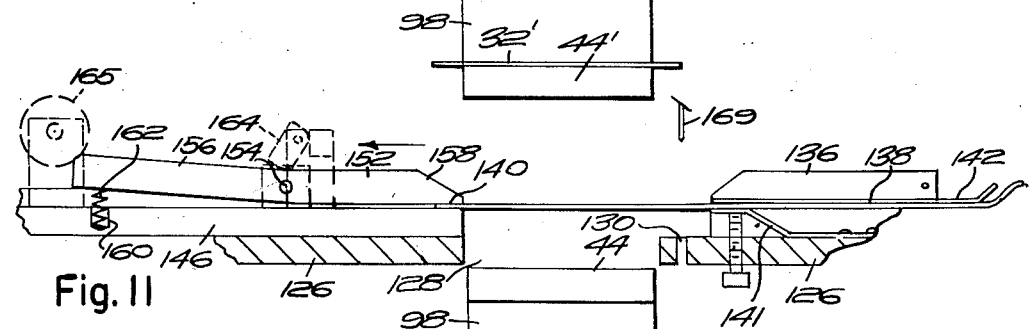
Figure 12:
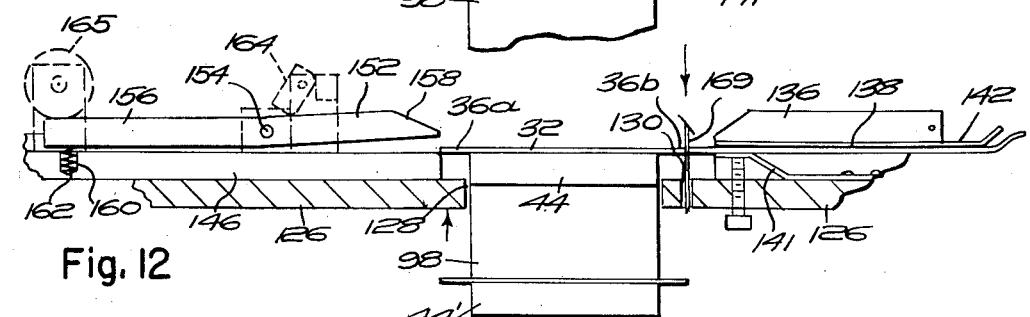

Figs. 9-12 are diagrammatic skeleton sectional views taken along the line 9—9 of Fig. 5, illustrating how the loading, holding and cutting mechanism functions to mount a cut rung on the leading edge of a jig cross bar, Fig. 9 showing the slide advanced to its innermost position with the movable jaw about to nip the tape, Fig. 10, showing the device after the movable jaw has fallen to nip the tape end, Fig. 11 illustrating how the movable jaw and slide function to pull the tape end across the open portion of the feeding mechanism in front of the leading edge of a jig cross bar and Fig. 12 illustrating the device in the act of cutting a rung so that each end thereof will project equal amounts laterally from each end of the cross bar.

Figure 13:
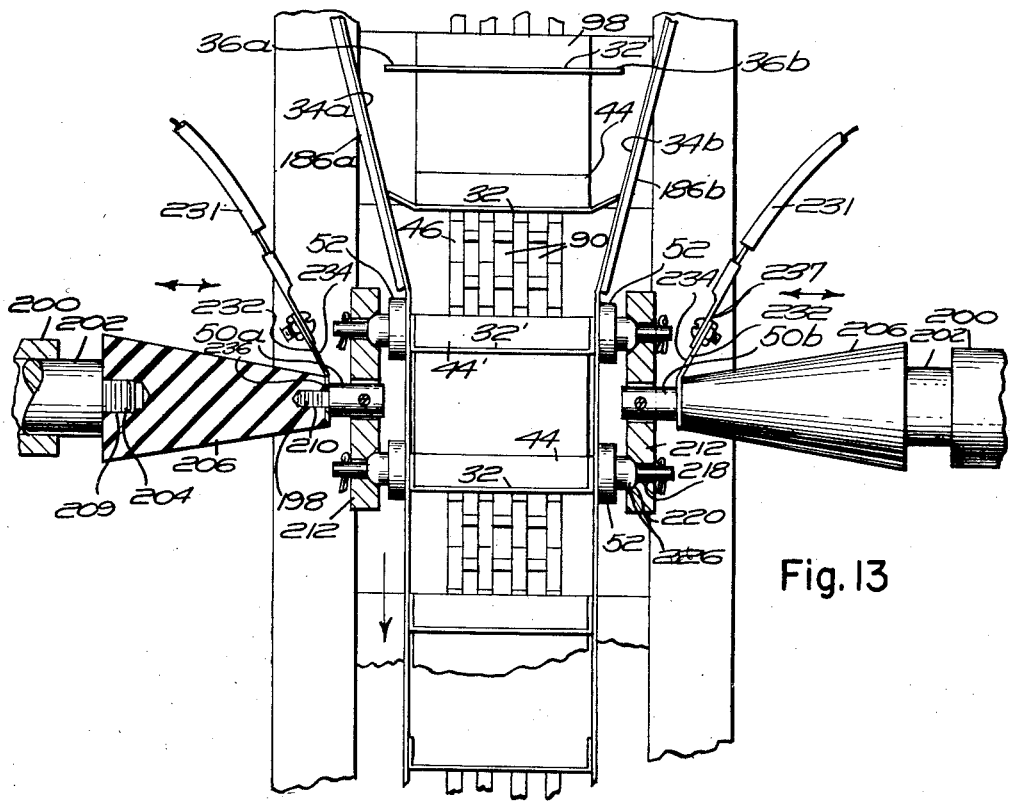

Fig. 13 is a fragmentary front elevation of a portion of the machine showing my improved welding electrodes moved into welding position, showing the electrode plates and one electrode in section.

Figure 14:
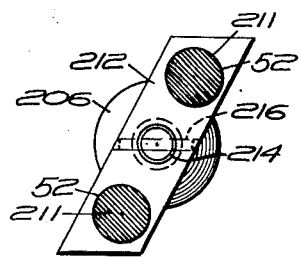

Fig. 14 is a side elevation looking outwardly towards the centre of an electrode.

Figure 15:
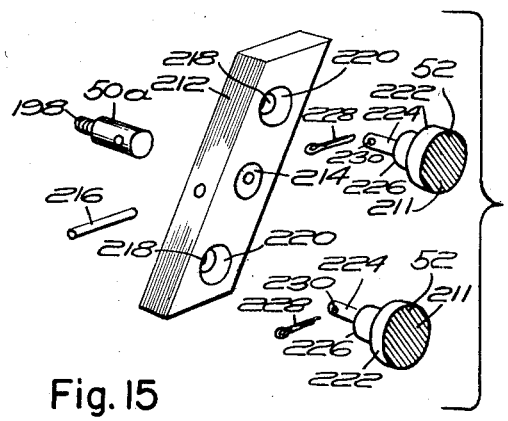

Fig. 15 is a diagrammatic exploded perspective view of my improved electrode structure adapted to weld the staggered ends of a pair of adjacent rungs.

Fig. 16 is a diagrammatic side elevational view illustrating the arms I employ to intermittently feed the conveyor, certain details of the overrunning stop lock and certain details of the structure of the means I employ to strip the completed tape from the conveyor.

Fig. 17 is an enlarged elevational view of the feeding finger I preferably employ.

Fig. 18 is a plan view of the intermittent feeding mechanism I preferably employ showing the slotted side guide bars in section.

Fig. 19 is a partial electrical diagram of the welding device, stop motion mechanisms and timing device I preferably employ.

Figure 20:
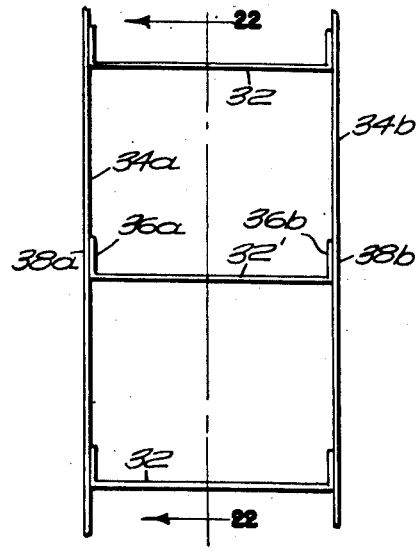

Fig. 20 is a side elevation of the improved substantially nonstretchable flexible plastic tape I preferably produce.

Figure 21:
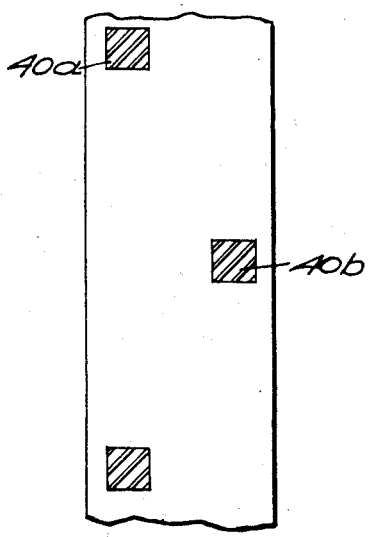

Fig. 21 is an end elevation thereof.

Figure 22:
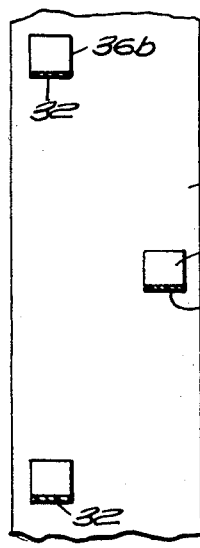

Fig. 22 is a sectional view thereof taken along the line 22—22 of Fig. 20.

Figure 23:
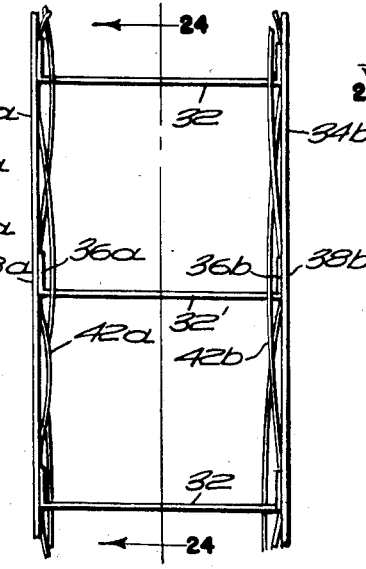

Fig. 23 is a side elevation of an alternate embodiment of my invention having cords welded between the inturned rung ends and the side tapes of the ladder tape.

Figure 24:
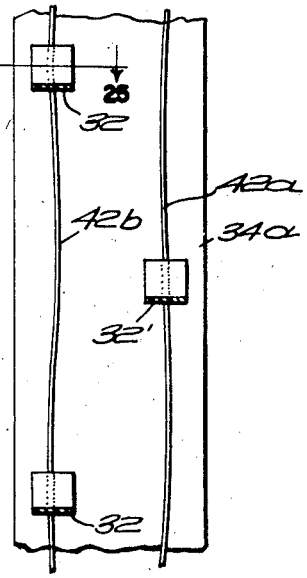

Fig. 24 is a sectional view thereof taken along the line 24—24 of Fig. 23.

Figure 25:
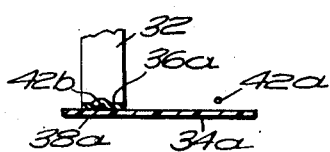

Fig. 25 is a transverse sectional view taken along the line 25—25 of Fig. 24.

In the drawings, wherein like characters of reference generally indicate like parts throughout, 30 generally indicates a machine for intermittently securing plastic ladder rungs to continuous runs of spaced ladder tape side strips constructed in accordance with my invention.

Broadly, said machine comprises means to insert plastic ladder rungs 32 between spaced ladder tapes 34a and 34b, with the respective ends 36a and 36b of said rungs 32 bent adjacent said tapes in the same direction for a substantial distance, in my preferred embodiment as shown in Figs. 20 and 21 with alternate rungs 32 and 32' laterally staggered from each other to provide aligned rows of rungs on each side of said tape and means to secure said bent ends 36a and 36b to said adjacent tape portions 38a and 38b by the welds 40a and 40b, or in any other suitable manner.

It is obvious that my machine is equally adapted to radio frequency welding or to any other type of means to secure said bent rung ends to said adjacent tape portions such as stapling, cementing, etc., although I obtain the best results faster employing radio frequency heat through the inturned ends and opposite tape portions and obtain a neater and better means of securement therefor.

In the embodiment shown in Figs. 23–25, I have supplementally welded the continuous longitudinal cords 42a and 42b between said inturned ends 36a and 36b and opposite side portions 38a and 38b to provide specific means for limiting the stretch of the side tapes 34a and 34b in which case it is necessary to add suitable means for feeding said cords to my improved machine.

A plastic ladder tape, however, may be provided which is stretchable only up to 1% of the length thereof, preferably of a 12–24 gauge (.012 to .024") thickness and which may comprise a vinyl resin having a suitable percentage of a stabilizer such as lead carbonate and plasticizer such as tricresyl phosphate incorporated therein sufficient to leave it flexible and still substantially nonstretchable, although any suitable heat sealable plastic or synthetic resin, preferably of sufficient thickness, may be employed. Suitable resin films for this purpose are sold by the Bakelite Corporation under the trade name of Vinylite, the Peabody Plastic Products Company of Peabody, Massachusetts, under the trade name of Plasbro and by the Rubber Corporation of America of Brooklyn, New York, under the trade name of Rucoam, etc.

In employing plastic tape for the side tapes 34a and 34b and the rungs 32 of sufficient thickness (12–24 gauge), welding marks on the walls of the tapes are substantially eliminated.

When the cords 42a and 42b are employed, these may comprise standard types of nylon stretch limiting cord.

In order to apply the radio frequency heat, I preferably employ movable conducting bars 44 and 44' to insert the plastic ladder rungs 32 and 32' between the spaced ladder tapes 34a and 34b with the ends 36a and 36b thereof adjacent said tapes in the same direction for a substantial distance, and I apply the welding radio frequency heat from electrodes brought opposite the outer portions of the side runs of the tapes in line with said upturned ends and the ends of the conducting bars, so that the conducting bars may function in the welding process as well as means to bring the rungs into suitable alignment for welding.

In my preferred embodiment, for this purpose I provide a continuous machine which feeds the jigs forward intermittently so that the rung ends may be welded to the tapes during each stop between movements. For this purpose I employ a continuous conveyor 46 and rung holding means such as said conducting bars 44 mounted on said conveyor spaced from each other the desired lengths between rungs.

I provide means 48 to load and hold a plastic rung 32 of greater length than said holding means 44 on the side of each rung holding means 44 with its ends 36a and 36b projecting equal amounts from said rung holding means.

I provide means to bend said end portions 36a and 36b rearwardly and means to feed side tape strips 34a and 34b spaced from each other the desired amount in the finished tape with said rearwardly turned rung ends 36a and 36b abutting said spaced strips 34a and 34b.

I provide means to secure said bent rung ends to said spaced strips which, as stated, may comprise any suitable type of securing means and preferably comprises the radio frequency welding means heretofore referred to and I provide suitable means to operate said machine, including means to intermittently advance said conveyor equal amounts corresponding to a function of the distance between rungs with a stop between each movement thereof, the length of movement of such means being determined by the number of rungs it is desired to weld at once and I provide means to actuate said rung loading and holding means during each stop and means to actuate said securing means or welding means during each stop. I may, in addition, provide an overrun preventing stop lock for said conveyor and means to move said lock into locking position during each stop and move it therefrom prior to the end of each stop. I may also, if desired, provide means to strip completed tape from said rung holding means and suitable means to actuate it.

While any suitable type of securing means may be employed, I preferably employ so-called radio frequency heating which develops heat in the dielectric plastic tape material, according to one theory by induction or to another theory by molecular friction. Various types of radio frequency generators may be employed. One is sold by the Kabar Manufacturing Corporation of New York. Another, entitled "A Thermatron" is sold by the Radio Receptor Company, Inc., of New York, and the elements of one in a sewing machine are described in Patent 2,432,412 issued December 9, 1947, to the Singer Manufacturing Company, to function at a frequency between 27–200 megacycles. For this purpose, I provide a pair of high radio frequency electrodes 50a and 50b having universally mounted aligned welding button heads 52 mounted on said machine to reciprocate against and away from the sides of said tape strip portions 38a and 38b opposite said rearwardly turned rung ends 36a and 36b, and I provide means to reciprocate said electrodes to abut the sides of said tape strips opposite said rung ends, and a high radio frequency generator 54 of the type hitherto described to apply energy through said electrodes 50a and 50b, rearwardly turned rung ends 36a and 36b and adjacent tape portions 38a and 38b to quickly weld the bent rung ends 36a and 36b to the opposite portions 38a and 38b of said tape strips during each stop. To actuate the electronic heat generator 54, I employ an electrical circuit 56 connected thereto, a settable timer switch 58 connected to said circuit and a timer switch starting switch 60 actuated by the electrode applying means as the electrodes 50a and 50b are moved inwardly to welding position to start said timer switch to energize said electrodes during each stop.

In addition, I provide suitable means operable on absence of a rung on an end of a cross bar to stop the machine which will be described in more detail later, and means operable on failure of said stripping means to strip the completed tape from said cross bars to stop the machine which will also be described in more detail later.

It is apparent, however, that my improved method may be accomplished by any type of machine or even by hand, said method comprising the novel method of (1) inserting a plastic ladder rung between spaced ladder tapes with the ends thereof bent adjacent said tapes for a substantial distance, and (2) securing said bent ends directly to said tape, preferably by applying welding radio frequency heat through said turned ends and opposite tape portions to weld said ends to said tape.

My preferred embodiment of machine, however, is preferably constructed as follows:

In the embodiment shown, said machine comprises an upright machine adapted to weld four rung ends at once, namely, the opposite rung ends of a pair of staggered rungs during each stop of the conveyor, although it is obvious that the operations may take place on a horizontal run of the conveyor instead of on the two vertical runs as shown. In the embodiment shown, the frame 61 comprises a skeleton upright oblong frame having the vertical corner bars 62 joined together respectively by the cross top front and rear bars 64 and the top side bars 66. Other cross bars may be provided, such as the lower front cross bar 68 and supplemental supporting side bars such as the top sprocket bearing supporting side bars 72, the bottom sprocket bearing supporting side bars 74, the oscillating feed shaft bearing supporting bars 76, the overrun preventing lock oscillating shaft supporting bearing bars 78 and the drive shaft supporting bearing bars 80.

To mount the conveyor on the frame, I provide the upper sprocket 82 suitably mounted on bearings 84 on said upper sprocket bearing supporting bars 72 and a lower sprocket 86 suitably mounted on bearings 88 mounted on the lower sprocket bearing supporting bars 74, said sprockets 82 and 86 having suitable teeth 89 adapted to mesh with suitable holes 90 in the chain conveyor 46 shown. The conveyor may be set, adjusted or tightened by raising or lowering its upper bearing 84 by means of the adjusting bolts 83 and nuts 85.

The chain conveyor 46 is thus continuous and provides an endless run around said sprockets providing a straight upward rear run 94 and a straight downward front run 96. To support the individual rungs formed and loaded thereon in a manner to be explained, I provide the rung holding jigs 98 longitudinally spaced from each other on the conveyor 46, having the flat base plates 100 mounted on said chain conveyor 46 to have the side edges 102 project laterally therefrom. I provide insulating blocks 104 projecting upwardly on said base plates of a length substantially the distance between the staggered rungs and spaced apart on a straight run substantially the desired distance between said rungs, having rung holding arms 106 and 108 projecting forwardly from the front and rear edges thereof of spaced heights substantially the desired horizontal spacing between rungs.

In my preferred embodiment I mount the conducting cross bars or holders 44, preferably of rectangular shape as shown, on the tops of said arms. I also provide suitable means to clamp each end of a cut rung of greater length than said bars to the leading edges of said bars, so that the ends thereof project substantially equal amounts therefrom, comprising the pivotally mounted finger clamps 110, having the pins 112 projecting laterally from the lower ends thereof, pivotally mounted centrally on the side walls of said blocks 104 as at 114 and having the upper clamping edges 116 adapted to abut the leading edge of each cross bar 44 or 44" on each side of said insulating blocks to clamp each end of each rung to the leading edges of said bars, and I provide spring means 118 comprising the coil springs connecting said clamps on each arm together connected to the front end of the finger clamp 110 opposite the leading cross bar 44 and the rear end of the finger clamp 110 opposite the trailing cross bar 44'.

To pivotally maintain said jigs in alignment during the straight upward and downward runs thereof, I provide the horizontally spaced vertical side bars 120 extending along the upper ends of each straight run, having cam plates 122 mounted thereon to tilt said jig clamps 110 to open position and internal grooves 124 receiving the side edges 102 of said jig plates to retain said jigs rigid and evenly spaced on their upward and downward runs. I provide, also, horizontally spaced means for each set of bars, namely, the leading set of bars 44 and the trailing set of bars 44', the ones for the leading bars 44 being located at a horizontally spaced distance above the one for the trailing bars 44' staggered vertically from each other the desired distance between rungs, to cut a plastic rung from a continuous plastic strip and load and hold it on the side of each bar with its ends projecting substantially equal amounts from said bar on the upward rear run with the said clamping means 110 being releasable during the insertion operation by the cams 122 while cutting a plastic rung 32 or 32" from a continuous strip and loading it on the side of each respective bar. As said loading means are identical for each alternate staggered bar, I will describe one in detail:

Said loading means comprises a transverse base plate 126 (126a or 126b) mounted on said frame in rear of said arms for this purpose, having the ends thereof mounted on the rear corner bars 62. Each base plate has a central open portion 128 of substantially the width of the jig cross bars 44 and has a knife slot 130 at a closely spaced distance on one end thereof, said end also having a rung tape spool 132 suitably mounted on a suitable bracket 134 mounted thereon. A cross guideway 136 is provided, having an open channel 138 near the lower end thereof through which the tape end 140 passes, providing the free tape end 140 adjacent said knife slot 130 urged upwardly by the spring 141. I also provide a flat guide spring 142 pressed downwardly against the tape by the closed guideway. I also provide an elongated open guideway 144 on the opposite side of said base plate beyond said open portion 128, having an elongated reciprocal slide 146 mounted thereon, having a cam 148 having an upper surface 150 tapered downwardly and outwardly and mounted substantially centrally of the upper surface of said slide 146. I also provide a clamping lever 152 centrally pivotally mounted as at 154 on brackets projecting upwardly from the central portion of said slide, having a straight rear end 156 and a normally upwardly tilted front end 158. A suitable hole 160 is provided in said slide 146 to receive the spring 162 to urge the rear end 156 of said lever upwardly, tilting the front end 158 thereof downwardly to form a movable jaw to clamp the projecting end 140 of the ladder tape 132 on the inner end of the stroke of said slide 146. I also provide an overhead retaining bar 164 swivably mounted on said plate 126 to extend over the rear end 156 of said lever to press it downwardly to release the front movable jaw end 158 when the slide 146 is urged outwardly, swivelable by the rear end of said lever as it starts to move outwardly. The roller 165 mounted on said base plate abuts said rear end 156 near its outermost position to release the tape after it is drawn the desired distance outwardly when the bar 164 swings to its position near said rear end.

It is thus obvious that with this construction when the slide 146 is pushed inwardly, so that its rear end no longer abuts the bar 164, that the spring 162 will push the rear end 156 of the lever upwardly so that its front movable jaw end 158 will clamp the free end of the tape 140 as shown in Fig. 10 and that as the slide 146 is drawn outwards, it will pull it across said opening 128 so that its end 36a will extend beyond said open portion 128 substantially the amount that said knife slot 130 is spaced from said open portion 128 and that the roller 165 will abut the rear end 156 to release the jaw end 158 at that time. To clamp said rung tape 32 to the base plate 126 during the cutting operation, I provide the spaced fingers 166 having their upper ends pivotally mounted on the pivot rod 168 mounted on said base plate to extend in rear of said open portion 128 with said spaced fingers 166 being mounted on the ends of said pivot rod, and I provide the transverse bar 170 overlying said fingers and a compression spring 172 contacting the bar to press said fingers 166 against said tape on opposite sides of said open portion. I also provide a knife blade 169 pivotally mounted on said pivot rod 168, having a cutting edge movable downwardly into said knife slot 130, and I provide a knife operating lever 174 pivotally mounted centrally on brackets 176 projecting upwardly from said base plate, having an inner end 178 overlying said knife 169 and an outer end 180 preferably having the roller 182 thereon exterior of said roller 165, urged upwardly by said slide cam 148 on extreme inward movement of said slide 146 to pivot the inner end 178 thereof to abut said knife 169 and urge it downward into said knife slot 130 to cut off the inner end of said tape, and I provide spring means 184 to abut said blade 169 to normally urge it to open position.

It is thus obvious that on initial movement of the slide inward to operating position that the jaw front end 158 of the lever 152 is held upwardly by the bar 164 until it reaches its innermost position when the rear end 156 leaves the bar 164 and is urged upwardly by the spring 162 to the position shown in Figure 10, causing said front end 158 to nip the free end 140 of the tape urged upwardly by the spring 141. Then, as the slide 146 is reciprocated to its outermost position, it will pull the tape to the position shown in Figure 11, with equal length ends 36a and 36b on opposite sides of said open portion 128, when the rear end 156 of said lever 152 will pass underneath the roller 165 to again raise said front end 158 to release the tape. The fingers 166 will then grip the tape to retain it against the base plate 126 during the cutting operation and as the slide 146 approaches the outer end of its stroke, the roller 182 will ride up the cam 148 causing the knife 169 to enter the slot 130 cutting off the end 36b of a rung 32, so that its length exterior of said open portion 128 will equal the length of the opposite end 36a beyond said open portion and that as soon as the slide again starts on its inward stroke, the knife lever 174 will ride free of the cam 148 and the spring 184 will urge the knife to its open position, and as soon as the conveyor and jigs start to move, the clamps 110 will clamp the cut rungs 32 against the leading edges of the conducting cross bars 44.

I also provide means to feed the side strips 34a and 34b continuously to the desired spaced distance from each other bending the ends 36a and 36b of the rungs 32 exterior of said bars rearwardly and for this purpose, I provide the inwardly inclined guide bars 186a and 186b providing a chute extending downwardly from the upper end of the frame to each side of the straight downward run 96 of the jigs 93 terminating substantially adjacent the sides of said jigs to bend the laterally projecting ends 36a and 36b of the rungs 32 and 32' upwardly or rearwardly between the side tapes 34a and 34b.

Each strip of tape 34a and 34b is mounted on a spool 188 mounted on brackets 190 projecting upwardly on each side of the frame. The tapes 34a and 34b are then passed over the upper guide rolls interior of said spools 188 and obliquely in line with the upper ends of said chute or guide bars or plates 186a and 186b.

To feed the tapes 34a and 34b evenly on each side of said jigs, I provide the takeup evener guide rolls 194 pivotally mounted in any suitable manner such as by the bails 196 on the pivot rods of the upper tape guide rolls 192 which abut the continuous runs of tapes 34a and 34b intermediate said upper guide rolls 192 and said spools 188 to flatten the respective continuous runs 34a and 34b of the side tapes and maintain them under even tension during the rung welding operation.

As stated hitherto, I may provide any suitable type of means such as stapling means, cementing means, lacquering means or electrical resistance heating means or otherwise to secure the ends 36a and 36b to their adjacent tape portions 38a and 38b, but I preferably for this purpose employ radio frequency welding to heat the dielectric tape sufficiently to provide the positive strong welds 40a and 40b and for this purpose I mount a pair of similar high radio frequency electrodes on said frame to reciprocate towards and away from the sides of said jigs immediately below the lower ends of said guide bars 186a and 186b.

In the embodiment shown, said electrodes 50a and 50b comprise the metallic cylindrical members 50a and 50b, having the threaded shanks 198 projecting outwardly therefrom. I mount the sleeves 200 horizontally of the adjacent portions of the front corner bars 62 and I provide the cylindrical rod portions 202 reciprocal in said sleeves 200, to reciprocate said electrodes, said rods also having threaded shanks 204 on the inner ends thereof. I also provide blocks of high frequency insulating material, in the embodiment shown comprising the frustro cones 206 having the threaded holes 209 centrally of the outer ends thereof and the threaded holes 210 centrally of the inner ends thereof. While any suitable type of high frequency insulating material may be employed, I preferably construct said blocks 206 out of glass bonded mica. The respective shanks 198 of said electrodes 50a and 50b and 204 of said rods 202 are threaded within said respective holes 210 and 209.

As stated hitherto, the functioning surface 211 of the electrodes is preferably universally mounted on the inner ends of the blocks 206, so that each electrode will lie flat against its respective tape edge during the welding operation. In the preferred embodiment shown I provide a structure which will weld the opposite two ends of a pair of staggered rungs 32 and 32' to the respective tapes 34a and 34b during each respective stop of the feeding mechanism. For this purpose, I provide the metal plates 212 of generally rectangular shape, having the central electrode receiving hole 214 of slightly greater diameter than the electrodes 50a and 50b. I provide the transverse pivot pins 216 extending through the inner ends of the electrodes 50a and 50b and said plates 212 exterior of said holes 214 to pivotally mount said plates 212 on said electrodes. I also provide each plate with the horizontal holes 218 adjacent each end thereof, each having the countersunk inner ends 220 and I provide the heat applying buttons 52 having the inner heads 222, having the preferably embossed inner surfaces 211 adapted to contact said tapes 34a and 34b on the portions 38a and 38b opposite the upwardly bent ends 36a and 36b of the short arm and long arm rungs 32 and 32'. Said buttons 52 also have the shanks 224 extending through said holes and semispherical portions 226 between said heads and shanks to abut the countersunk hole ends to universally mount each respective button 52 on said electrodes 50a and 50b, and I provide suitable means to secure the outer ends of said button shanks 224 to said plates 212, in my preferred embodiment shown comprising the cotter pins 228 adapted to extend through suitable holes 230 in the outer ends of said shanks. As shown, said electrodes 50a and 50b are so secured in the ends of said blocks 206 that each plate 212 inclines outwardly from the jig short arms to the jig long arms (Fig. 14).

It is apparent, however, that any other suitable means may be employed for universally mounting the heat applying surfaces 211 on the electrodes 50a and 50b on their supporting blocks 206. In the embodiment shown, the wires 231 carrying the high radio frequency electricity are attached to each respective electrode by a suitable connector 232, in the embodiment shown comprising a flat plate 234 having a hole 236 therein surrounding the shank 198 and abutting the inner cylindrical end of its respective electrodes 50a and 50b adjacent the inner end or tip of the frustro conical insulating block 206, said plate 232 being connected to the wire 231 by any suitable type of a connecting plug 237, such as the type shown.

As stated hitherto, to apply the high radio frequency heat through said buttons 52 and conducting bars 44 where employed, to quickly weld the upwardly bent rung portions 36a and 36b on a jig to the opposite portions 38a and 38b of said tape, I provide the radio frequency generator 54 of the type hitherto described.

As stated, I provide suitable means to operate said machine, including means to intermittently advance the conveyor equal amounts corresponding to the distance between bars and rungs with a substantial stop between each movement thereof. I provide an over run preventing stop lock for said conveyor and means to move said lock into locking position during each movement and remove it therefrom prior to the end of each stop period. I provide means to actuate said means 48 to cut, load and hold rungs on the successive pairs of conducting bars 44 and 44' of said conveyor during each such stop. I also provide means to reciprocate said electrodes 50a and 50b to abut the sides of said tape strips and rung ends interposed between said tape strips and ends of said conducting bars during each stop. I provide means to strip completed tape from said bars. I provide means to actuate said tape stripping means during each stop. To supply suitable heat, I provide an electric circuit 56 connected to the electronic heat generator 54, a settable timer switch 58 connected in said circuit and a timer switch starting switch 60 actuated by the electrode applying means as it is moved to welding position to start said timer switch to heat said electrodes during each stop.

In the building of the actual machine, certain portions of these means overlap with each other and in order to describe them I will describe the actual structure of the machine.

In the machine, the means to strip completed tape from said jigs comprises a pivot shaft 238 mounted transversely of the front of the frame adjacent the end of the downward front run 96 of the conveyor, an inner bail 240 having its bail arms 242 pivotally mounted on said pivot and a bail base 244 mounted on the lower ends of said arms 242, an outer bail 246 of slightly greater width having its arms 248 also pivotally mounted on said shaft 238 and having a corresponding bail base 250 comprising a rod mounted on the lower ends of said arms 248 covered with rubber 252 or other suitable material. A link 254 joins one of each set of arms 242 and 248 together, having an end pivotally secured to the outer bail arm 248 as at 256 and a lower end having a longitudinal slot 258 therein receiving the extended end of the inner bail base 244. An oscillatable shaft 260 is mounted centrally of said frame, having a crank arm 262 mounted thereon and a connecting rod 264 is pivotally connected to the central portion of said link 254 and the said crank arm 262, whereby on outward movement of said rod 264 said link urges the inner bail base 244 against said outer bail base 250 to grip the welded tape and pull it from said jigs, and on inner movement of said connecting rod 264, said inner bail base 244 separates from said outer bail base to permit the stripped tape to drop between said bases 244 and 250.

While any suitable means to drive the machine may be employed, in the embodiment shown I preferably employ an electric motor 266 driven by a suitable main circuit 268. I employ a main drive shaft 270 driven by said motor extending across the front of the machine. In the embodiment shown, said drive shaft has a sprocket 272 mounted thereon and the cams 274 having inwardly facing cam surfaces 276 mounted on each end thereof exterior of said frame and a crank arm 280 mounted on the free end thereof having a radial slot 282 therein. As the means to intermittently advance the conveyor, I provide the conveyor drive shaft 284 oscillatably mounted transversely back centre in rear of said electrodes, having an elongated crank arm 286 projecting downwardly and forwardly therefrom, having a vertical hole 288 in the end thereof and a crank arm 290 projecting upwardly therefrom, a connecting rod 292 having a lower end having a rod 294 projecting laterally therefrom adjustably mounted within the slot 282 on said main drive shaft crank arm 280 and extending through and a substantial distance upwardly beyond said hole 288 on said conveyor crank arm 286, having stop means such as the lock nuts 296 on the upper end thereof and a spring 298 interposed between said lock nuts and conveyor crank shaft arm 286. I provide the oscillatable arms 300 spaced from each other substantially the width of the jig plates 100 rigidly mounted on said conveyor drive shaft 284 extending forwardly to adjacent said jig plate ends 102, having pivot pins 302 projecting laterally from the upper portions of the front ends thereof and having means such as the stop pins 304 on the lower portions thereof projecting laterally inwardly of said pivot pins 302. Each arm 300 has a finger lever 306 having a central longitudinal slot 308 receiving said arm pivot pin 302, and a downwardly tapered upper surface 310 adjacent the inner end thereof and a pin 312 projecting laterally from the outer end thereof and a spring 314 joining said pivot pin 302 to said outer pin 312, whereby said fingers 306 may abut a jig plate end 102 to move the conveyor forward the length of said jigs on each downward movement of the crank arm 300 and said fingers 306 may pivot and slide inwardly as shown in Fig. 16, so that their inner ends 310 may pass the said jig plate ends and conveyor on each upward movement of the crank arm 300. It is thus obvious that with this construction the motor drives the main drive shaft 270 which, through the medium of the crank arm 280 and connecting rod 296, oscillates the conveyor drive shaft 284 so that the pivot fingers 306 may move it forward the distance between rungs or jigs on each oscillation thereof on each rotation of said drive shaft. I also provide an over run preventing stop lock for said conveyor comprising an oscillatable rod 316 transversely pivotally mounted on the front upper portion of the frame immediately in rear of said conveyor, a downwardly curved cam arm 318 mounted thereon extending rearwardly therefrom urged upwardly by said conveyor drive shaft crank arm 290, spring means 320 connected to said arm 318 and to said frame to normally urge said arm 318 downwardly against said upwardly projecting conveyor drive shaft crank arm 290 and a stop locking plate 322 adjustably securable to said oscillatable rod 316 by means of the set screw 324 to pivotally mount it on said oscillatable rod having aligned pairs of teeth 326 projecting inwardly therefrom the distance between the leading edges of said jig plates, whereby when said drive arm 284 is oscillated by said main drive shaft, said arm 316 mounting said over run preventing stop plate 322 may be similarly oscillated by the spring 320, so that said teeth 326 will be oscillated into position abutting the leading edges of said jigs at the end of the period that the arms 300 serve to urge the conveyor forward, and will be withdrawn therefrom by the arm 290 contacting the cam arm 318 connected to said stop drive shaft 316 as soon as said stop period is over.

In the embodiment shown, the means to oscillate said electrode rods 202 comprise the levers 328 pivotally mounted centrally thereof on the brackets 330 projecting laterally from the frame, having the upper ends 332 pivotally secured to the outer ends of said electrode rods in any suitable manner such as by the bolts and cotter pins shown at 334 and the lower ends in the embodiment shown having the cylindrical extensions 336 adapted to abut the face cams 276 on the inner ends of the cams 274 on the ends of the main drive shaft 270 to urge said electrode rods 202 outwardly after the welding operation as the extensions 336 abut the high portions 338 of said cams during the conveyor feeding period. Spring means 340 are provided to urge the electrode rods 202 inwardly when said extensions 336 abut the low portions 342 of the cams during the stop welding period. For this purpose, the right angle cranks 344 have their bases 346 pivotally mounted on pivot pins 348 on extensions 350 projecting laterally from the side walls of the frame. Said cranks 344 have downwardly projecting arms 352 abutting the ends 354 of the electrode rods 202 and outwardly projecting arms 356. The springs 340 have their upper ends attached to the outer ends 358 of said outwardly projecting arms and their lower ends attached to extensions 360 projecting outwardly from the frame below them. It is thus obvious that with this construction that as the cylindrical portions 336 of the lower ends of the levers 328 abut the low portions 342 of the cams 276, that the springs 340 will urge the crank arms 356 downwardly so that their downwardly projecting crank arms 354 will abut the outer ends of the electrode rods 202 to urge the electrodes 50a and 50b and their heat applying surfaces 211 against the portions 38a and 38b of the side tapes 34a and 34b opposite the rearwardly turned ends 36a and 36b interposed between the ends of the conducting bars 44 and said side tapes 34a and 34b to apply a welding heat through the dielectric plastic side tapes and inturned ends to provide the welds 40a and 40b joining said inturned ends 36a and 36b to said side tapes 34a and 34b during the stop welding period after the welding heat is generated in the manner to be explained. It is obvious any suitable means, pneumatic, hydraulic or otherwise may be employed to oscillate said electrodes.

To provide means to actuate the loading mechanisms 48, I provide the rear drive shaft 362 having the drive sprocket 364 thereon and the chain 366 connecting the sprocket 272 on the front main drive shaft 270 with the sprocket 364 on said rear drive shaft 362, said rear drive shaft having an arm 368 to oscillate said spaced slides 146a and 146b for the respective upper long run arms 44 and said lower short run arms 44', with said arm 368 projecting from the free end of the rear drive shaft opposite the motor 266. I provide the pivotally mounted cranks 370a and 370b for each slide 146a and 146b, having the respective upwardly projecting arms 372a and 372b shown, pivotally connected to their respective slides 146a and 146b by the pintles 374a and 374b and the inwardly projecting arms 376a and 376b. I provide a vertically reciprocal rod 378 connected to said inwardly projecting arms 376a and 376b by the bolts 380a and 380b. I also provide a supplemental arm 382 having an upwardly bent inner end 384 connected centrally to the upwardly projecting arm 372b on the lower short arm crank arm 370b by the bolt 386, said arm having a stop 388 thereon normally abutting the outer edge of the upwardly projecting arm 372b of said crank 370b and I provide safety spring means 389 connecting said upwardly bent arm end 384 and said upwardly projecting crank arm 372b and I provide a link 390 which may be adjustable in any suitable manner such as shown at 392, having an upper end connected to the outer end 394 of said suplemental arm 382 and a lower end connected to the arm 368 on said rear drive shaft 362. I also provide the adjusting counterbalancing weights 396 on the lower end of said vertical rod 378. It is obvious that the spring 389 and the weights 396 provide an easy, even movement for the slides 146a and 146b at all times.

To actuate the stripper mechanism I provide an additional arm 398 mounted on said rear drive shaft and a drive arm 400 mounted on said stripper pivot shaft 260 and a link 402 joining said arms 398 and 400 together to oscillate said stripper shaft 260 to actuate the stripper mechanism in the manner hitherto explained.

As stated, I also provide stop motion mechanisms for stopping the machine in the event that a rung end does not cover each end of a conducting rod 44 and in the event that the finished tape is not stripped cleanly from the jigs. As these stop motion mechanisms, however, are right on the machine, it is essential that they function on a low voltage such at 12 volts, compared to the voltage required to heat the electrodes 50a and 50b and actuate the motor 266. The circuit from the main line 268 is connected by the line 404 to the electronic heater 54 which in turn is connected to the electrodes 50a and 50b by the line 406 or 56 through the respective conducting bars 44 and 44'. Current from the main line is also conducted through the line 408 to the motor push button main switch 410 through the switch 412 of the magnetic relay switch in said main circuit by the line 414 or 268 to the motor 266.

A branch 416 of the line 408 leads to the transformer 418 in said main circuit to transform the voltage from the high voltage coil 420 thereof to the low voltage coil 422 thereof, and I provide a secondary circuit 424 of much lower voltage connected to said secondary coil 422 connected by the branch 426 to the coil 428 of the relay 430 to actuate the switch 432 thereof.

The relay switch 432 is connected by the primary line 434 to the solenoid 436 of a magnetic make and break switch which is also connected by the branch line 437 to the primary line 408, the switch 412 of which is connected to the branch 414 of the main primary circuit, as explained.

As the stop motion to stop the machine in the event a rung end is not loaded on each end of a conducting bar 44 or 44', I provide the metal strips 438a and 438b adapted to abut the respective ends of the bars 44 and 44' as they pass by on the conveyor, projecting inwardly in the paths of the ends of the connecting cross bars of the arms of the jigs. If the cross bars are properly loaded with plastic rungs 32 on the leading edges thereof, the projecting ends 36a and 36b thereof will be interposed between the metal strips 438a and the conducting ends of the bars 44. Should, however, no rung be mounted on there at all, or an end 36a or 36b should not be suitably gripped thereon, the secondary current will pass through the two adjacent respective metal strips 438a and 438b temporarily connected through a bar 44 or 44'. Should this contingency occur, current will pass through the lines 424 and 426 to actuate the solenoid 428 of the relay switch 430 to break the primary current in the line 434 to actuate the solenoid 436 to break the magnetic switch 412 to shut off the motor 266.

In order to stop the machine, in the event that the tape is not being suitably stripped therefrom, I provide the switch 440 connected to a branch 442 of said secondary circuit having a pivotal switch arm 444 pivotally connected to one line pivotal to abut a contact 446 in the other line thereof, and I provide the elongated switch lever 448 pivotally mounted on the frame as at 450 having a short arm 452 to abut said switch arm 444 to close the switch 440 and a long arm 454 extending underneath the stripped completed tape and the jigs 98. When the stripping mechanism functions to strip the tape from the jigs 98, the arm 454 always remains free of the tape, but should it fail to strip the tape from the jigs 98, the unstripped tape functions to move the arm 454 downwardly and inwardly to close the switch 440 to actuate the relay 430 to actuate the magnetic switch solenoid 436 to function to stop the motor 266 in the manner hitherto explained.

As stated, to regulate the time of feeding, if desired I may provide a settable timer switch 456 or 58 having a suitable dial 458 and a settable pointer 460 so that the pointer may be set to regulate the time of heating. The timer switch 456 is connected to the electronic heater by the line 462 and to the main line by the line 464. To start the timer switch I provide the line 466 extending to a timer switch starting switch 468 or 60 having the movable switch blade 470 normally urged to open position by the spring 472, but movable to a closed position abutting the contact 474 on the opposite line of said branch line 466. Said timer switch starting switch 468 is actuated by the electrode rod applying means as an electrode rod 202 is pushed inwardly to start the functioning of the timer switch 456 and for this purpose, as shown, is mounted on the lower end of the lever arm 328 to be closed by the lower portion of said arm as it moves outwardly as the spring 340 urges said electrode rod 202 inwardly. It is obvious, however, that any projection mounted on any suitable portion of the machine, such as on the exterior surface of the cam 274, may be employed to actuate said switch 468 in the desired portion of the cycle at the starting of the stop period and it is obvious that the timer switch 456 is set to apply heat through the electrodes through the desired portion of the stop period of said cycle. If desired, however, the timer 456 may be dispensed with and the time of heating controlled by the length of a cam.

In general, the various parts of the machine are so operated that the feeding means only functions to feed the conveyor during a portion of the cycle and that all the other operations hitherto described are set to function during the stop portion of the cycle. The operation of the machine has already been described in the operation of each individual part thereof, and it is obvious that all the operative has to do is to load the spools 188 with the continuous strips for the side tapes 34a and 34b and the spool for the continuous strip 132 for the rung tapes respectively, press the push button 410 and the machine will operate to successively produce ladder tape, feeding intermittently and welding intermittently during each rotation of the main drive shaft 270 until the spools are exhausted when the machine may be stopped and replenished. The welds 40a and 40b cause the continuous side strips 34a and 34b to be fed by the cross bars of the conveyor. It is also obvious that the device is substantially fool-proof as the two stop motions described function to stop the machine on failure of loading a rung properly or on failure of proper stripping.

It is thus apparent that I have provided a machine which may be run continuously involving a new mode of operation, a novel method of making ladder tape and a novel ladder tape, all with the advantages described above.

It is understood that my invention is not limited to the specific embodiments shown or methods described, and that various deviations may be made therefrom without departing from the spirit and scope of the appended claims.

What I claim is:

1. A machine for intermittently securing plastic ladder rungs to continuous runs of spaced ladder tape strips comprising a continuous conveyor, rung holding means mounted on said conveyor spaced from each other the desired lengths between rungs, means to load and hold a plastic rung of greater length than said holding means on a side of each rung holding means with its ends projecting equal amounts from said rung holding means, means to bend the end portions of said rungs rearwardly, means to feed tape strips spaced from each other the desired amount in the finished tape with said rearwardly turned rung ends abuting said spaced strips, means to secure said bent rung ends to said spaced strips, and means to operate said machine including means to intermittently advance said conveyor equal amounts corresponding to a function of the distance between rungs with a stop between each movement thereof, means to actuate said rung loading and holding means during each stop, and means to actuate said securing means during each stop.

2. Apparatus according to claim 1 having an overrun preventing stop lock for said conveyor and means to move said lock into locking position during each stop and remove it therefrom prior to the end of each stop.

3. A machine according to claim 1 having means to strip completed tape from said rung holding means and means to actuate said means to strip tape from said rung holding means.

4. A machine for intermittently welding plastic ladder rungs to continuous runs of spaced ladder tape strips, comprising a continuous conveyor, conducting cross bars insulatedly mounted on said conveyor spaced from each other the desired length between rungs, means to load and hold a plastic rung on the side of each bar with its ends projecting substantially equal amounts from said bar, tape strip holding means mounted on each side of the conveyor in front of said means, inwardly inclined tape strip guide bars extending inwardly from the outer edges of the frame to each side of a straight run of the bars terminating substantially adjacent the ends of said bars to bend the laterally projecting end portions of the rungs rearwardly against the tape strips, a pair of high radio frequency electrodes having universally mounted aligned welding button heads mounted on said frame to reciprocate against and away from the sides of said tape strips opposite said rung rearwardly turned ends opposite the ends of said conducting cross bars immediately after said guide bars and means to operate said machine, including means to intermittently advance said conveyor equal amounts corresponding to the distance between bars and rungs with a stop between each movement thereof, means to actuate said means to load and hold rungs on the successive conducting bars of said conveyor during each stop, and a high radio frequency generator to apply induction heat through said electrode buttons and conducting bars to quickly weld the bent rung ends on the conducting cross bars to the opposite portions of said tape strips during each stop.

5. A machine for welding plastic ladder rungs to continuous runs of spaced ladder tape, comprising movable conducting bars to insert plastic ladder rungs between spaced ladder tapes with the ends thereof bent adjacent said tapes in the same direction for a substantial distance, with alternate rungs laterally staggered from each other to provide aligned rows of rungs on each side of said tape and means to apply a welding radio frequency heat through said upturned ends of a pair of staggered rungs opposite tape portions and conducting bars to weld said ends to said tapes.

6. A machine for welding plastic ladder rungs to continuous runs of spaced ladder tape, comprising movable conducting bars to insert plastic ladder rungs between spaced ladder tapes with the ends thereof bent adjacent said tapes in the same direction for a substantial distance and means to apply a welding radio frequency heat through said upturned ends opposite tape portions and conducting bars to weld said ends to said tapes.

7. A machine for positioning plastic ladder rungs between and securing them to continuous runs of spaced ladder tape comprising feeding means for advancing two strips of ladder tape in spaced parallel relation a predetermined distance apart, a plurality of movable rung-holding jigs each including a spacing bar said jigs being movable from outside of said ladder tapes to a predetermined position therebetween to thereby insert and locate plastic ladder rungs between said strips of ladder tape with the ends thereof bent adjacent said tapes in the same direction, and securing means to cooperate with said bars to attach the bent ends of said rungs to said tapes.

8. A machine for positioning plastic ladder rungs between and securing them to continuous runs of spaced ladder tape comprising feeding means for advancing two strips of ladder tape in spaced parallel relation a predetermined distance apart, a plurality of movable rung-holding jigs each including a spacing bar said jigs being movable from outside of said ladder tapes to a predetermined position therebetween to insert and locate plastic ladder rungs between said strips of ladder tape with the ends thereof bent adjacent said tapes in the same direction, securing means adapted to cooperate with said bars to attach the bent ends of said rungs to said tapes, and stripping means for removing said rungs from said jigs after said rung ends have been secured to said tapes.

EDWARD JANOWSKI.

(References on following page)

REFERENCES CITED

The following references are of record in the file of this patent:

UNITED STATES PATENTS

| Number | Name | Date |
|---|---|---|
| 1,828,347 | Straus | Oct. 20, 1931 |
| 1,931,324 | Newton | Oct. 17, 1933 |
| 2,210,433 | Roscoe | Aug. 6, 1940 |
| 2,284,563 | Dillman | May 26, 1942 |
| 2,290,634 | Clark | July 21, 1942 |
| 2,354,714 | Strickland | Aug. 1, 1944 |
| 2,377,962 | Preston | June 12, 1945 |
| 2,405,579 | Hunter | Aug. 13, 1946 |
| 2,413,003 | Sherman | Dec. 24, 1946 |
| 2,422,525 | Brown | June 17, 1947 |
| 2,439,918 | Auxier | Apr. 20, 1948 |

FOREIGN PATENTS

| Number | Country | Date |
|---|---|---|
| 573,518 | Great Britain | Nov. 23, 1945 |

OTHER REFERENCES

Hoyler, An Electronic "Sewing Machine," 1943 issue of Electronics (7 pages).